Nov. 26, 1940.  C. G. JONES  2,222,977
METHOD OF WELDING
Filed Oct. 18, 1938  3 Sheets-Sheet 1

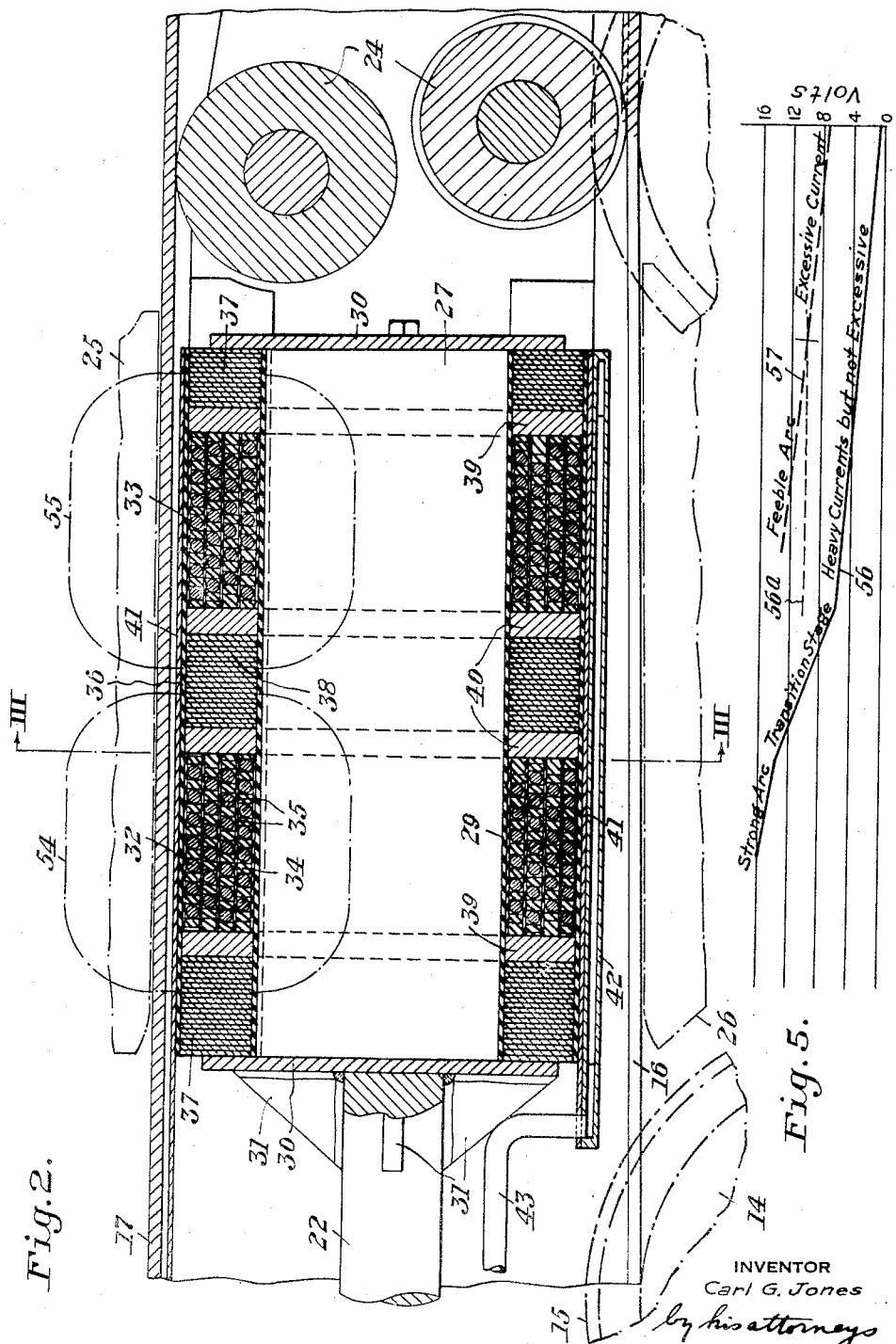

INVENTOR
Carl G. Jones
by his attorneys
Stebbins, Blenko & Parmelee

Nov. 26, 1940.   C. G. JONES   2,222,977
METHOD OF WELDING
Filed Oct. 18, 1938   3 Sheets-Sheet 3

INVENTOR
Carl G. Jones
by his attorneys
Stebbins, Blenko & Parmelee

Patented Nov. 26, 1940

2,222,977

UNITED STATES PATENT OFFICE 2,222,977

METHOD OF WELDING

Carl G. Jones, Youngstown, Ohio, assignor to The Youngstown Sheet & Tube Company, Youngstown Ohio, a corporation of Ohio Application October 18, 1938, Serial No. 235,569

5 Claims. (Cl. 219—10)

This invention relates to electric welding and, particularly, to what I shall herein designate as arc-resistance welding.

Various forms of electric welding are now known and have been successfully practiced for many years. In resistance welding, the passage of electric current between abutting metallic surfaces causes heating at the spaced points at which the surfaces are in contact. The high points of the surfaces, on continued heating, are gradually burned away and the entire surface is heated to such an extent that a weld can be effected.

The "high points" first make contact and are fused back to the edges. From these fused points the heat spreads to the adjacent portions of the edges until the whole edge surface is heated to a fusing or welding temperature. From this point the temperature continues to increase until the high specific resistance due to high temperature reduces the current flow.

If the voltage applied across abutting metallic surfaces is raised above a predetermined minimum value, the heating of the surfaces proceeds more rapidly and the contacting portions thereof are actually volatilized and ejected with considerable force. The rather violent evolution of volatilized material instantaneously exposes portions of the metal surfaces to atmospheric oxidation. This leaves brittle spots in the weld when finished because of the resulting thin oxide layer prevents perfect union of metal to metal, producing a discontinuous weld.

The usual arc weld between adjacent metal surfaces is made by feeding the members to be welded toward each other at the rate at which the opposed surfaces are burned off or volatilized by the arc, thus progressively to heat up portions of the metal spaced from the extreme edges whereupon they may be forced together and welded. Both arc welding and resistance welding as now practiced are made possible by allowing sufficient time to burn off or upset the opposed edges to the extent, at least, of the thickness of the piece being welded, and by insuring intimate contact. Otherwise expressed, the conditions for satisfactory welding by either the arc or resistance method are sufficient time and accurate control of conditions.

It has been attempted heretofore to utilize both arc welding and resistance welding by a combination of the two methods which I shall designate herein as arc-resistance welding. An example of this practice is the induction welding of pipe from cylindrical blanks each having a longitudinal seam cleft defined by the edges of the flat skelp from which the blanks are formed. According to the method previously practiced, the blanks were subjected progressively to the action of a periodically varying magnetic field of such character as to induce currents flowing circumferentially thereof and across the seam cleft. The seam cleft was progressively closed as the heating of the edges thereof proceeded and a continuous weld finally effected. In this method of welding, the heating is the result of the arcing between the edges of the seat cleft prior to the initial contact thereof as well as of the resistance of the joint after the initial contact. The circumferentially induced currents have a metallic path from the point of initial contact of the seam cleft edges onward to the end of the zone of influence of the magnetic field. In the other direction (i. e., that in which the seam cleft edges diverge) current flows across the seam cleft forming an arc, as far back along the cleft as the applied voltage is capable of forcing current across the widening cleft. The magnitude of this voltage is determined by the intensity of the magnetic field and is usually a compromise between the optimum voltage for resistance welding and the minimum voltage required for arc welding. There is obviously a substantial difference between these voltages, since, in resistance welding, the pipe constitutes substantially a short circuit.

Certain objections to the previous practice have been encountered in actual operations. In the first place, the induced voltage across the seam cleft, in order to provide stable arcing, must be too high for satisfactory resistance welding. In a particular case, for example, a voltage of about fifteen volts is preferred for arc welding. The voltage desired for resistance welding, however, is much lower, of the order of three to five volts. The result of excessive voltage in the resistance heating zone is a violent explosive action resulting in the formation of the oxidized spots in the finished weld as previously described. If the welding zone is made fairly long, furthermore, to obtain good coupling between the inducing coil usually employed to produce the magnetic field, and the advancing pipe blank, the voltage across the seam cleft is so high that too much metal is burned off. If the welding speed is increased to prevent excessive burn-off, the speed of the entering cold edges is too great for a stable arc to form and as a result, the arc varies widely, first covering a substantial length of the advancing edges and then contracting to relatively short length therealong. If the welding zone is made short, the voltage induced is not sufficient to produce much arcing and poor coupling results as well as discontinuous welds. A further disadvantage of the present practice is that a considerable portion of the length of the tube blank at each end thereof is left unwelded and must be cut off and scrapped.

I have invented a novel method of arc-resistance welding which overcomes the aforementioned objections and is characterized by further novel features and advantages. I pass the edges to be welded through a succession of independently controlled magnetic fields of different intensities to induce a voltage between opposed points along the edges of the seam cleft substantially above the minimum necessary to cause an arc between such points and then, after preliminary heating by arc currents, to induce a voltage between said points substantially below said minimum arcing value, yet sufficient to cause heavy circumferential currents to flow across the cleft after the edges have been abutted, thus continuing the heating by the resistance method. After the edges of the cleft have been heated to welding temperature in this manner, they are pressed firmly together to complete the weld. Briefly stated, the invention comprises subjecting the edges for a definite length of time to a voltage substantially above the minimum arcing value and then for a further time to a voltage substantially lower than said minimum to continue the heating by the resistance method.

The apparatus which I prefer to employ in practicing the invention comprises an inductor having separate coils thereon for inducing the arc heating voltage and the resistance heating voltage respectively. Independent control means for regulating the excitation of these coils makes it possible so to adjust the intensities of the magnetic fields produced thereby that the desired voltages are induced in both the arcing heating zone and the resistance heating zone. The invention will be described in detail hereinafter with reference to the accompanying drawings illustrating the practice and apparatus of my invention as applied to the example hereinbefore mentioned, viz., the welding of pipe from cylindrical blanks, but it is to be understood that the invention is also equally applicable to the welding of metal members of other forms. In the drawings:

Fig. 2 is a sectional view showing a portion of Fig. 1 to enlarged scale;

Fig. 5 is a graph showing the variation of the applied voltage from point to point along the heating zone.

Figure 1:
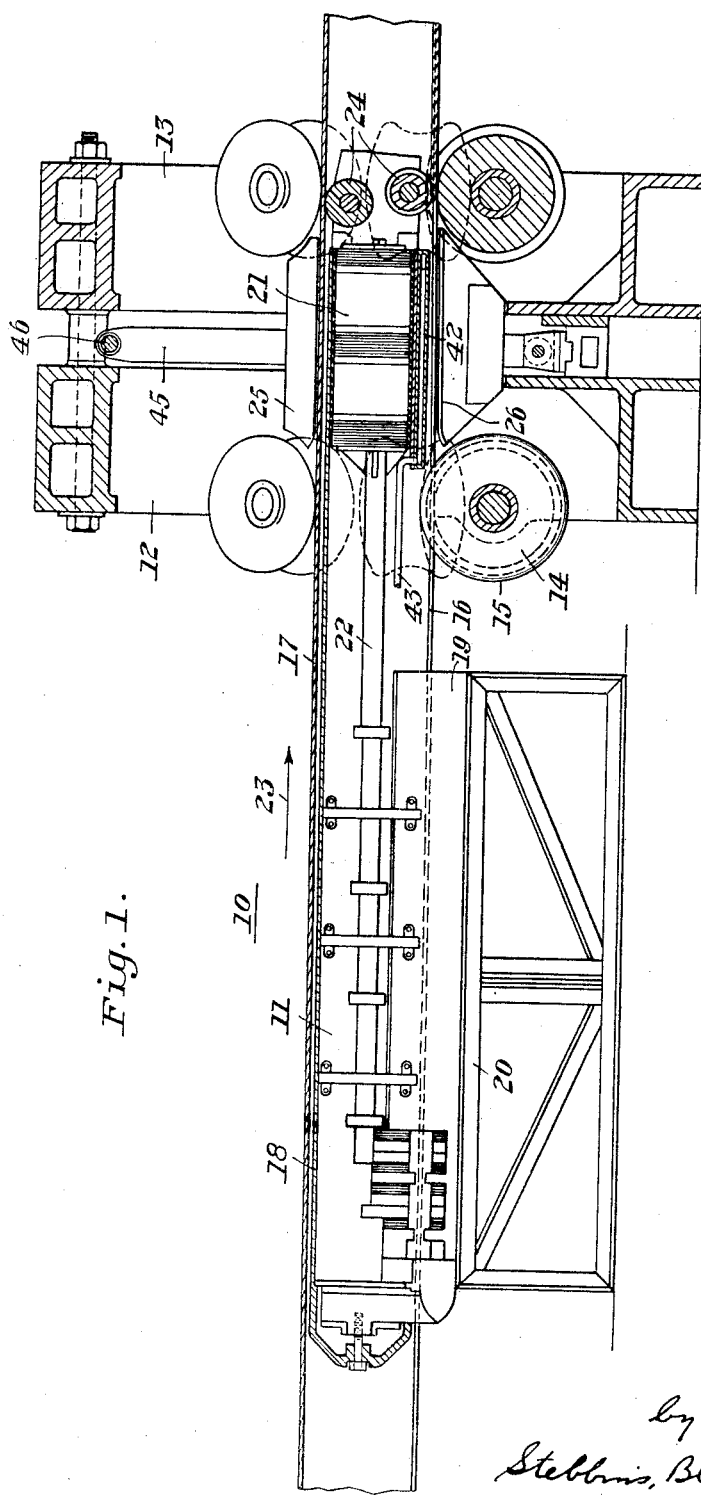
Fig. 1 is a longitudinal-vertical sectional view through a welding apparatus embodying the invention.

Referring now in detail to the drawings and, for the present particularly to Fig. 1, pipe welding apparatus embodying my invention is indicated generally at 10 and comprises a torpedo 11, a stand of feed-in rolls 12 and a stand of welding rolls 13. The stands of feed-in and welding rolls are of known construction so a detailed description thereof is not necessary. It should be stated, however, that the bottom roll 14 of the feed-in stand has a central fin 15 adapted to enter the seam cleft 16 of an advancing pipe blank 17, to maintain the edges thereof in spaced relation. The torpedo 11 comprises a tubular shell 18 disposed on any suitable frame work including a depending plate 19 anchored to a supporting structure 20. The advancing pipe blank thus embraces the torpedo preparatory to passing through the throats defined by the feed-in and welding rolls, the edges of the seam cleft passing on opposite sides of the plate 19.

A coil and core assembly indicated generally at 21 is mounted on the torpedo by means of a tension rod 22 extending rearwardly and being attached to the torpedo frame. (The terms "forwardly" and "rearwardly" as used herein apply to the direction of travel of the pipe blank indicated by the arrow 23.) The forward end of the torpedo is provided with supporting and guide rolls 24 adapted to travel along the interior of the pipe. Guides 25 and shoes 26 mounted in any convenient manner on the stands 12 and 13 cooperate to direct the blank emerging from the rolls of stand 12 into the rolls of stand 13.

Figure 3:
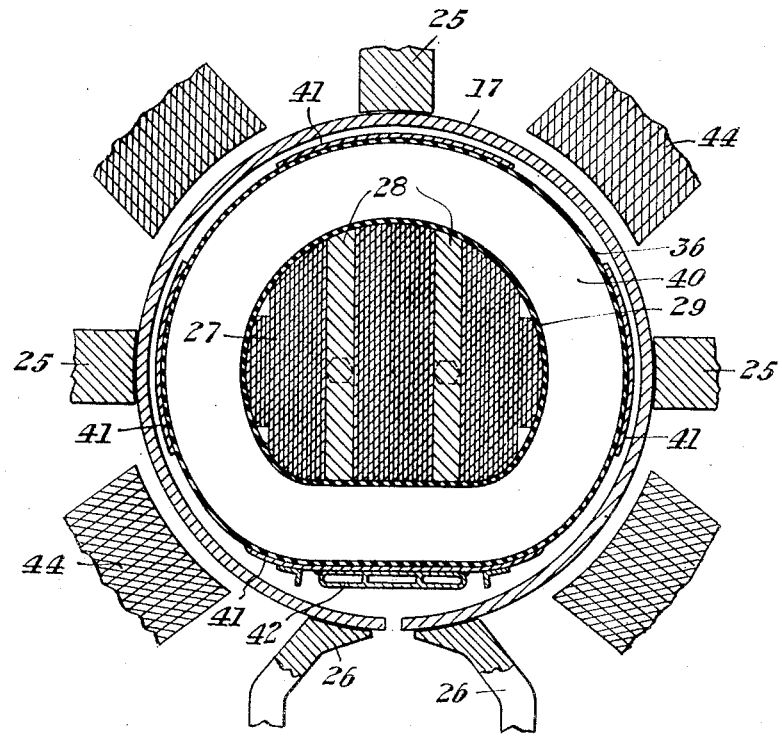
Fig. 3 is a partial transverse sectional view taken along the line III—III of Fig. 2.

The coil and core assembly 21, hereinafter referred to as the inductor, is shown in detail in Figs. 2 and 3. The core is shown at 27. It is substantially cylindrical in shape and is composed of laminations assembled between supporting plates 28. A layer of insulating material 29 surrounds the core. The plates 28 are connected at their ends by plates 30 secured thereto, the tension rod 22 being secured to the rear plate 30 by gusset plates 31.

Inducing coils 32 and 33 are disposed on the core 27 in spaced relation. Adjacent turns of the coils are separated by spacing rings 34 and adjacent layers by annular layers of insulation 35. Exciting current is supplied to the coils by means to be described shortly, the supply conductors extending from the coils rearwardly through the torpedo and radially along the plate 19 to the exterior of the blank. An outer layer of insulation 36 surrounds the coils. Pole pieces 37 formed of annular laminations are disposed between each coil and the adjacent end of the core. A similar pole piece 38 is disposed between the coils. The pole pieces 37 may conveniently be assembled between the end plates 30 and annular spacer plates 39. The pole piece 38 is similarly disposed between spacer plates 40. The entire coil and core assembly may be protected by spaced armoring plates 41 if desired but it is essential that no continuous conducting path be provided circumferentially of the inductor, except, of course, that provided by the blank 17. A cooling jacket 42 may be attached to the armoring plate nearest the seam being welded in order to protect the inductor from the heat thereof. Cooling water is supplied to and collected from the jacket by connections 43 extending rearwardly along the torpedo and outward thereof in the same manner as the conductors of the circuit supplying exciting current to the primary windings 32 and 33.

Figure 4:
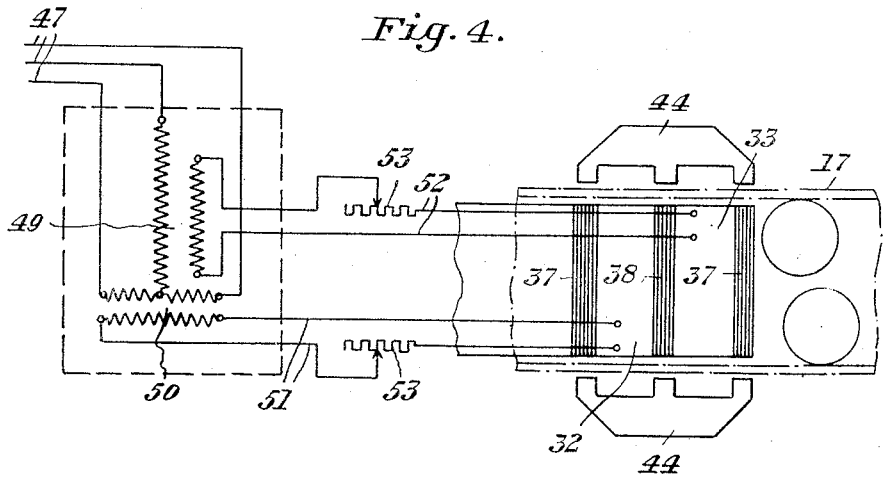
Fig. 4 is a diagram showing the electrical circuits for exciting and controlling the inducing coils.

It will be understood from the foregoing description that the inductor 21 and the blank 17 constitute a transformer, the blank being a secondary winding wherein currents circulate, through the usual transformer action, in opposition to the currents traversing the primary windings 32 and 33. To reduce the reluctance of the magnetic circuits, yokes 44 are disposed in spaced relation about the inductor. The shape of the yokes in side elevation is shown in Fig. 4, from which it will be seen that they have poles cooperating with the pole pieces 37 and 38. The yokes 44 are mounted on supporting members 45 (see Fig. 1) mounted for pivotal movement adjacent their upper ends, and an adjusting screw shaft 46 connects the upper ends of the supports 45 whereby they may be moved closer together or farther apart, thereby adjusting the spacing between the yokes 44 and the blank 17.

Fig. 4 illustrates one form of supply circuit and control means therefor. As there shown, a three phase supply circuit 47 extends to transformers 49 and 50 arranged in the so-called Scott connection to energize two single phase exciting circuits 51 and 52. The circuit 51 is connected to the coil 32 and the circuit 52 to the coil 33. Each circuit has a current control device illustrated as a rheostat 53. It will be understood, however, that any convenient type of control mechanism may be substituted therefor such as induction regulators, transformers or auto transformers with tap changing equipment, or a combination of these elements.

In the use of the apparatus described to perform the method of my invention, a formed pipe blank such as that shown at 17 is advanced over the torpedo 11 with its seam cleft in alignment with the supporting plate 19 and the fin 15 on the bottom roll 14 of the feed-in stand 12. Any suitable means (not shown) may be employed for advancing the blank to a position in which its leading end enters the feed-in stand 12. The rolls of the stands 12 and 13 are driven by mechanism already known. The rolls of stand 12 operate as pinch rolls but because of the fin on the bottom roll 14, the seam cleft 16 remains open until a point between the stands 12 and 13 is reached.

As the leading end of the blank passes over the inductor, the flux produced by the coil 32 in the magnetic circuit indicated generally at 54 in Fig. 2 induces a voltage circumferentially of the blank. Since the seam cleft is still open, however, no current flows across the cleft because the voltage is insufficient to break down the air gap between the cleft edges. The leading end of the blank then advances further until it comes into the zone of influence of the coil 33, i. e., the magnetic circuit indicated at 55. As the end of the blank advances, the guides 25 and shoes 26 contract the blank forcing the edges of the cleft into abutment at a point about midway between the stands 12 and 13. At the first contact, current flows between the cleft edges and an arc is formed immediately by the resulting heating, between the portions of the cleft edges which have not yet been brought into contact. Once initiated, the arc extends rearwardly until the distance between the cleft edges is greater than that across which the available voltage will cause a flow of current in the presence of the heat and ionized condition of the atmosphere created by the arcing between the edges at points rearwardly from the point of initial contact.

I regulate the exciting current supplied to the inducing coil 32 so that the voltage induced in the portion of the blank surrounding the coil at any instant is substantially in excess of that necessary to maintain an arc between the cleft edges, at the spacing at which they are maintained at that point in their travel. For example, while a voltage of the order of 10 or 11 volts is about the minimum which will maintain an arc between the edges at the spacing at which they are maintained in the neighborhood of the coil 32, I excite the latter sufficiently to induce a voltage of from 14 to 16 volts circumferentially of the blank. On the other hand, when the cleft edges have been brought into contact and are in the zone of influence of the coil 33, I subject them to magnetic field of the proper intensity, determined by regulating the rheostat 53, to induce a circumferential voltage of from 3 to 5 volts.

The arc flushes the blank edges and leaves the extremities thereof in a molten state so that they will adhere to each other on initial contact but not be welded to each other. The edges are progressively pressed together from the instant of first contact until they pass out of the weld stand 13, where they are firmly pressed together, and the weld completed.

Fig. 5 illustrates roughly the voltages induced circumferentially of the blank at various points in its movement over the inductor. The left hand end of curve 56, for example, shows the voltage induced in the blank at points in alinement therewith on Fig. 2. It will be noted that the voltage does not appear until the blank has reached substantially the mid-point of the coil 32 and the voltage decreases slightly with movement of the blank toward the welding stand. As shown by the curve, the voltage varies between 16 and 14 volts which is substantially in excess of the minimum voltage (roughly 10 volts) indicated by ordinate 56a required to initiate an arc. For this reason, the effect of the coil 32 is to produce and maintain a strong arc across the seam cleft capable of effecting rapid heating of the edges.

The effect of the coil 33 is to induce a circumferential voltage in the blank as illustrated by the right hand end of curve 56. As illustrated, this voltage varies from about 6 volts to about 3 volts by the time the point on the blank has passed beyond the end of the inductor. This voltage is sufficient to produce heavy circumferential currents for resistance heating but not to cause the violent explosive action observed with previous welding methods and apparatus in which the voltage for resistance heating was not very different from that employed for arc welding.

Between the initial and final stages of heating by arc and resistance is a transition stage so marked on curve 56 during which the voltage circumferentially of the blank falls sharply. At about the mid-point of this transition stage the arc ceases and further heating is effected by resistance.

As the trailing end of the blank uncovers the coil 32, the arcing voltage will drop rapidly. This drop in the voltage may be compensated for by increasing the excitation of the coil 32 or of the coil 33. I prefer to do the former. The necessary regulation of the current may be effected manually or automatically by any suitable means, in accordance with the movement of the blank over the inductor.

Fig. 5 also includes curve 57 which illustrates, for the purpose of differentiation, the voltages circumferentially of a pipe blank produced by a typical inductor of the form used heretofore. As in the case of curve 56, the ordinates represent the circumferential voltage and the abscissae the distance rearwardly from the axial plane of the rolls of the welding stand. It will be readily understood from Fig. 5 that the apparatus used heretofore was capable of initiating arc heating current only after the cleft edges had quite closely approached the point of actual contact and that the voltage available to produce arc heating current was sufficient only to maintain a relatively feeble arc. On the other hand, the voltage available to produce resistance heating beyond the point of actual contact of the edges was greatly in excess of the necessary voltage so that the violent explosive action heretofore mentioned was experienced.

It will be appreciated that the invention makes it possible for the first time to apply to the different stages of an arc-resistance heating operation, voltages appropriate to the character of heating and amount of current desired. By eliminating the violent explosive action heretofore encountered in the resistance heating stage, I avoid discontinuity in the weld resulting from oxidation spots produced by such action. The invention also makes it possible to weld at greater speed than has been attained heretofore since the rate of arc heating is increased by the method and apparatus disclosed herein. The voltage applied for arc heating, furthermore, may be varied to effect greater or less burn-off, depending on the character of the edges being welded as to regularity or roughness, without affecting the voltage applied during the resistance heating stage.

The invention also makes it possible to lengthen the welding zone to obtain good coupling for the arc heating portion, further increasing the welding speed and reducing the loss due to unwelded ends of the blank. The scrap loss represented by the unwelded end portions is reduced by the invention to about one-third of the amount previously experienced, at both leading and trailing ends. As stated, the arc heating conditions the edges by burning off variations from true parallelism. The resistance heating, furthermore, may be individually controlled to obtain the desired character of heating, i. e., either moderate or intense. The tapering throat formed by the guides 25 and 26 gradually increases the pressure between the edges to be welded, thus extruding all oxides or cold spots, i. e., spots not heated to welding temperature.

A further advantage of distinct value is that since the resistance heating is marked by the absence of any violent explosive action, there is no spray of burned off metal to deposit on the welding rolls. This eliminates slag markings on the pipe and reduces the frequency of the necessary periodical removal of slag deposited on the shoes. While the arc heating stage produces some flying hot metal, the amount thereof is considerably reduced by the invention and it is concentrated at a distance from the rolls of the stands 12 and 13. The aforementioned extrusion of hot metal has the further advantage of preventing too rapid cooling of the welded seam and the brittleness of the weld which would otherwise result therefrom.

While I have illustrated and described herein but a preferred embodiment and practice of the invention, it will be understood that changes therein may be made without departing from the spirit of the invention or the scope of the appended claims. As already stated, the application of the invention to pipe welding disclosed herein is purely illustrative and it is not to be considered as limited thereto.

I claim:

1. In a method of welding longitudinally moving metallic edges converging gradually into engagement with each other, the steps including progressively applying between said edges at points at which they are spaced apart, a voltage substantially higher than the minimum needed to establish and maintain an arc between said edges, concurrently applying progressively between said edges, at points at which they have engaged, a voltage substantially lower than said minimum, and when said edges have been heated to welding temperature, pressing them firmly together.

2. The method as defined by claim 1 characterized by applying said voltages by electromagnetic induction.

3. In a method of making pipe from substantially cylindrical blanks having a longitudinal seam cleft by moving the blank and gradually forcing the edges together, the steps including progressively applying between said edges at points at which they are spaced apart, a voltage substantially higher than the minimum needed to establish and maintain an arc between said edges, concurrently applying progressively between said edges, at points at which they have engaged, a voltage substantially lower than said minimum, and when said edges have been heated to welding temperature, pressing them firmly together.

4. In a method of making pipe from substantially cylindrical blanks having a longitudinal seam cleft by moving the blank and gradually forcing the edges together, the steps including progressively applying between said edges at points at which they are spaced apart, a voltage substantially higher than the minimum required to establish an arc between said edges, thereby creating an arc-heating zone, concurrently applying progressively between said edges, at points at which they have engaged, and at a predetermined distance from said zone, a voltage substantially lower than said minimum, thereby creating a resistance-heating zone and, when said edges have been heated to welding temperature, progressively pressing them firmly together.

5. In a method of making pipe from substantially cylindrical blanks having a longitudinal seam cleft by moving the blank and gradually forcing the edges together, the steps including progressively applying between said edges at points at which they are spaced apart, a voltage at least 40% higher than the minimum required to establish an arc between said edges, thereby creating an arc-heating zone, concurrently applying progressively between said edges, at points at which they have engaged, and at a predetermined distance from said zone, a voltage at least 50% lower than said minimum, thereby creating a resistance-heating zone and, when said edges have been heated to welding temperature, progressively pressing them firmly together.

CARL G. JONES.